(12) United States Patent
Wilkens

(10) Patent No.: US 7,104,393 B1
(45) Date of Patent: Sep. 12, 2006

(54) BEARINGS FOR RECIPROCATING FLOOR CONVEYOR

(76) Inventor: Arthur L. Wilkens, 820 N. 5th St., Stockton, KS (US) 67669

( * ) Notice: Subject to any disclaimer, the term of this patent is extended or adjusted under 35 U.S.C. 154(b) by 0 days.

(21) Appl. No.: 11/160,970

(22) Filed: Jul. 18, 2005

(51) Int. Cl.
*B65G 25/04* (2006.01)

(52) U.S. Cl. .................. 198/750.4; 198/750.2

(58) Field of Classification Search ............ 198/750.1, 198/750.2, 750.3, 750.4
See application file for complete search history.

(56) References Cited

U.S. PATENT DOCUMENTS

| | | | |
|---|---|---|---|
| 4,143,760 A | 3/1979 | Hallstrom | 198/750 |
| 4,144,963 A | 3/1979 | Hallstrom | 198/750 |
| 4,184,587 A | 1/1980 | Hallstrom | 198/750 |
| 4,474,285 A | 10/1984 | Foster | 198/750 |
| 4,492,303 A | 1/1985 | Foster | 198/750 |
| 4,679,686 A | 7/1987 | Foster | 198/750 |
| 4,749,075 A | 6/1988 | Foster | 198/750 |
| 4,785,929 A | 11/1988 | Foster | 198/750 |
| 4,858,748 A | 8/1989 | Foster | 198/750 |
| 4,899,870 A | 2/1990 | Foster | 198/750 |
| 4,907,691 A * | 3/1990 | Foster | 198/750.2 |
| 4,984,679 A | 1/1991 | Foster | 198/750 |
| 5,064,052 A | 11/1991 | Foster | 198/750 |
| 5,139,133 A | 8/1992 | Foster | 198/750 |
| 5,165,525 A | 11/1992 | Quaeck | 198/750 |
| 5,323,894 A | 6/1994 | Quaeck | 198/750 |
| 5,346,056 A | 9/1994 | Quaeck | 198/750 |
| 5,355,994 A | 10/1994 | Foster | 198/750 |
| 5,419,426 A | 5/1995 | Foster | 198/750 |
| 5,560,472 A | 10/1996 | Gist | 198/750 |
| 5,588,522 A | 12/1996 | Foster et al. | 198/775 |
| 5,806,660 A | 9/1998 | Foster | 198/750 |
| 6,409,009 B1 | 6/2002 | Foster | 198/750 |
| 6,585,106 B1 | 7/2003 | Foster | 198/750 |
| 6,763,933 B1 | 7/2004 | Wilkens et al. | 198/750.3 |
| 6,786,324 B1 * | 9/2004 | De Raad | 198/750.4 |
| 6,889,819 B1 * | 5/2005 | Foster | 198/750.3 |

* cited by examiner

*Primary Examiner*—James R. Bidwell
(74) *Attorney, Agent, or Firm*—Head, Johnson & Kachigian

(57) ABSTRACT

A bearing for a reciprocating floor conveyor. The reciprocating floor conveyor includes a plurality of sub-deck guide beams and a plurality of floor slats. The bearing includes a load carrying top having an upper surface to receive at least one floor slat thereon and an opposed lower surface mating with one of the guide beams. The upper surface of the top includes a plurality of clean-out grooves. A first leg and a second leg each extend from the top with the legs spaced from each other a distance slightly longer than the width of one of the guide beams. A hinge mechanism permits the legs to move between two positions, a use position with the distance between the legs slightly shorter than the width of one of the guide beams and an installation position where the legs are separated or wider than the guide beam while installing onto the guide beam.

16 Claims, 4 Drawing Sheets

BEARINGS FOR RECIPROCATING FLOOR CONVEYOR

BACKGROUND OF THE INVENTION

1. Field of the Invention

The present invention is directed to a bearing for use with a reciprocating floor conveyor wherein bearings are mounted on sub-deck guide beams. In particular, the present invention is directed to a bearing for a reciprocating floor conveyor which includes a hinge mechanism to assist in installation of the bearing on and around a sub-deck guide beam and which provides an improved wear surface between the bearing and the floor sliding slat.

2. Prior Art

Reciprocating floor conveyors are well known for use in various applications. For example, vehicles, factory conveyors, large bunkers, truck boxes and semi-trailers or trailers will use reciprocating floor conveyors to transport and load or unload various types of cargo, such as bulk material, pallets, bales, sacks or commodities. One known application is in open top semi-trailers. The reciprocating floor conveyor systems might also be used in cargo containers or other storage devices. The reciprocating floor conveyor can also be driven on by forklifts making a reciprocating floor conveyor very versatile.

The reciprocating floor conveyor systems typically include a plurality of parallel floor slats or floor members which extend a portion or all of the floor length of the trailer and support the load. The floor slats are normally 3 to 12 inches wide so that many slats cover the inside width of the trailer. The floor slats are moved or reciprocated either manually or with a drive unit or units. The floor slats or floor members are slidably mounted to the floor.

In one well known arrangement, a plurality of plastic slide bearings support the floor slats so that the floor slats ride on the plastic bearings. The plastic bearings, in turn, are spaced along and mounted on a plurality of parallel guide beams. The bearings surround and are supported by the sub-deck guide beams. The guide beams are then supported by the trailer's structure. In one arrangement, the guide beams are composed of tubular metal and are, in turn, fastened to a plurality of transverse support beams with the guide beams extending across an upper surface of the support beams. The slide bearings usually are installed over and placed upon the guide beams where the guide beams and the trailer's cross members intersect each other.

There are often 1,000 to 1,500 plastic slide bearings on a single trailer and the plastic bearings wear over time. Dirt or dust from the road or the cargo load itself may get between the bearing and floor slat and accelerate wear. Various solutions to this problem have been proposed in the past including Assignee's prior U.S. Pat. No. 6,763,933 entitled "Reciprocating Floor Conveyor". Accordingly, the floor slats must be removed, the old slide bearings removed and disposed of, and a new set of slide bearings installed onto the guide beams and the floor slats replaced.

Each bearing may include a pair of inwardly facing flanges or clips at the end of the extending legs with the space between the clips less than the width of the tubular guide beam. Although the plastic bearings are somewhat resilient, they are not very flexible. Accordingly, it is necessary to pry open the bearing in order for it to fit over the tubular guide beams. Often a tool and considerable labor is required to install each bearing.

Several approaches to these issues have been taken in the past.

Foster (U.S. Pat. No. 4,679,686) in FIGS. 11 through 15 discloses a bearing with lock flanges 126 and 128 which extend downwardly and then upwardly. The lock flanges provide cam surfaces 134 and 136 which flare outwardly so that a downward force causes sides 96 and 98 to be sprung apart until the bearing snaps into place. In practice, considerable force, such as hammering, is required to force the side to be spread apart.

Foster (U.S. Pat. No. 4,492,303) discloses a slide bearing 26 with sidewall portions 50, 52, 54 and 56. Inwardly directed lock flanges 60, 62, 64 and 66 extends laterally inwardly from each sidewall portion. Longitudinal wings 68 and 70 project laterally outward on each side of the bearing.

Foster (U.S. Pat. No. 4,474,285) discloses floor members 94 mounted for sliding movement by means of slide bearings 96 which are required to be snap fit onto longitudinal guide beams 98.

Hallstrom (U.S. Pat. No. 4,144,963) discloses a bearing with a top wall 32, laterally resilient sidewalls 34, and downwardly and inwardly extending lugs 36. Sides must be spread apart in order to fit over a guide beam.

Foster (U.S. Pat. No. 4,749,075) discloses a bearing having sidewalls 40 and 42 that spread apart to receive a width of the guide beam 12 as seen in FIGS. 3 through 5.

Foster (U.S. Pat. No. 5,139,133) discloses bearings 18 which include opposite sidewalls 22 and 24, cams 30 and 32, and wings 34 and 36. A downward force applied to the bearing is required to cause the cams to move downwardly spreading the sidewalls apart.

Accordingly, it is a principal object and purpose of the present invention to provide a new type of slide bearing for a reciprocating floor conveyor which is easier to install and remove with less labor and in less time.

It is a further object and purpose of the present invention to provide a new type of slide bearing for a reciprocating floor conveyor which will have an improved wear surface between the bearing and the floor slat.

SUMMARY OF THE INVENTION

The present invention is directed to a reciprocating floor conveyor system having a plurality of floor slats which are arranged in side-by-side and parallel fashion. The reciprocating floor conveyor system includes a plurality of transverse support beams. Mounted on top of and secured to the transverse support beams are a plurality of sub-deck guide beams which may be welded or otherwise secured to the support beams. The guide beams are parallel to each other and form tracks for movement of the floor slats.

A slide bearing includes a load carrying top which rests on and mates with the top of the guide beam. A lower surface of the top is generally flat and mates with the top of the guide beam. The load carrying top also includes an upper surface, opposed to the lower surface, which is generally flat and receives the floor slat thereon. When installed, the bearing is mounted on and resides on the guide beam and is stationary therewith. The floor slat reciprocates on the upper surface of the slide bearing.

The bearing also includes a first leg which extends outward and downward from the top and a second leg which extends outward and downward from the top. The legs are spaced from each other a distance which is slightly longer than the width of the guide beam. The first leg has an inwardly extending clip or flange. Likewise, the second leg has an inwardly extending clip or flange. The space between the clips or flanges is less than the width of the guide beam.

Accordingly, the first leg and the second leg must be spread apart wide enough so that the bearing will fit over the sub-deck.

A hinge mechanism allows the first leg and second leg to be separated from each other for the purpose of installation or, conversely, for removal. In one embodiment, the hinge mechanism includes a recess which is made or formed into the lower surface of the top of the slide bearing. In an alternate embodiment, the hinge mechanisms include a hinge between each leg and the top of the bearing.

The upper surface of the bearing includes a plurality of clean-out grooves. The clean-out grooves are recessed into the upper surface of the top of the bearing. Accordingly, any dirt or other materials that may be present between the upper surface of the bearing and the floor slat will be encouraged to fall into the grooves and away from the interface between the bearing and the floor slat, thus, highly increasing the life of the floor.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
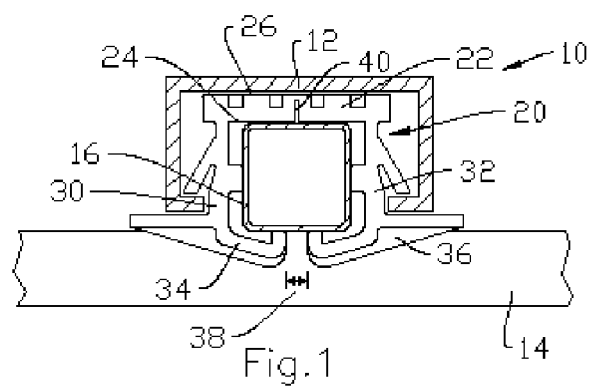
FIG. 1 illustrates a sectional view of a reciprocating floor conveyor system having a slide bearing constructed in accordance with the present invention.

FIG. 1 illustrates a sectional view of a portion of a reciprocating floor conveyor system illustrating the elements of the present invention. A plurality of floor slats 12 are arranged, side by side in parallel fashion (only one floor slat shown in FIG. 1) and are substantially C-shaped. The slats, made from aluminum, PVC, fiberglass or other material, support a load (not shown).

When in use on a tractor trailer, the reciprocating floor conveyor system 10 includes a plurality of transverse support beams 14 (one support beam 14 visible in FIG. 1). Mounted on top of and secured to the transverse support beams 14 are a plurality of sub-deck guide beams 16 (one guide beam visible in FIG. 1). The guide beams 16 may be welded or otherwise secured to the transverse support beams. The guide beams 16 are parallel to and spaced from each other and form tracks for movement of the floor slats 12. In a preferred embodiment shown, the guide beams 16 are tubular having a square cross-section. It will be understood that other configurations of the guide beams are possible within the spirit and scope of the present invention.

A slide bearing 20 of the present invention is shown in FIG. 1 installed on a guide beam 16 with the floor slat 12 installed on the slide bearing 20. Once installed, the slide bearing 20 is generally stationary with respect to the guide beam 16. The floor slat 12 moves and reciprocates with respect to the slide bearing 20.

The slide bearing 20 includes a load carrying top 22 which rests on and mates with a top of the guide beam 16. Accordingly, a lower surface 24 of the top 22 is generally flat and mates with the top of the guide beam 16. The load carrying top 22 also includes an upper surface 26, opposed to the lower surface, which is generally flat and receives the floor slat 12 thereon. When installed as shown in FIG. 1, the bearing 20 is mounted on and resides on the guide beam 16 and is stationary therewith. The floor slat 12 is capable of reciprocating on the upper surface 26 of the slide bearing 20.

The bearing 20 also includes a first leg 30 which extends outward and downward from the top 22 and a second leg 32 each of which extends outward and downward from the top 22. The legs 30 and 32 are spaced from each other a distance which is slightly longer than the width of the guide beam 16. Accordingly, the slide bearing 20 fits over and surrounds not only the top 22 but the sidewalls of the guide beam 16. The first leg 30 has an inwardly extending clip or flange 34. Likewise, the second leg 32 has an inwardly extending clip or flange 36. The clips or flanges 34 and 36 extend inward toward each other.

The space between the clips or flanges 34 and 36 illustrated by arrow 38 is less than the width of the guide beam 16. Accordingly, the first leg 30 and the second leg 32 must be spread apart wide enough so that the bearing 20 will fit over the sub-deck 16.

Figure 2:
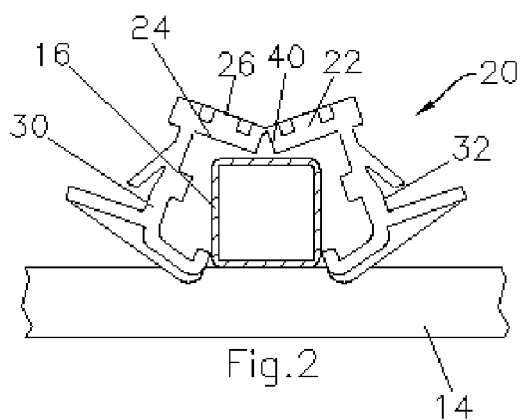
FIG. 2 illustrates a slide bearing of the present invention shown in FIG. 1 while being installed in a reciprocating floor conveyor system.

FIG. 2 illustrates a sectional view of the reciprocating floor conveyor system during the process of inserting a bearing 20 onto the guide beam 16. A hinge mechanism 40 allows the first leg and second leg 32 to be separated from each other for the purpose of installation and, conversely, for removal. In the embodiment shown in FIGS. 1, 2 and 3, the hinge mechanism 40 includes a recess which is made or formed into the lower surface 24 of the top 22 of the slide bearing 20.

Accordingly, the slide bearing 20 may easily be moved between a closed or use position as shown in FIG. 1 wherein the distance between the legs 30 and 32 is only slightly longer than a width of the guide beam and an installation position shown in FIG. 2 wherein the legs 30 and 32 may be separated while installing on the guide beam 16.

In order to install the reciprocating floor conveyor, a number of bearings 20 are installed in spaced locations over each guide beam 16. In installing each bearing, the first leg 30 extending from the top is separated from the second leg extending from the top using the hinge mechanism 40. Accordingly, the space between the clips or flanges 34 and 36 is larger than the width of the guide beam so that the bearing 20 will fit over the guide beam. Once the legs are fit over the guide beam, the hinge mechanism is returned to a closed position so that the lower surface of the top is flat and rests on the guide beam 16. When in the closed or installed position, the legs 30 and 32 surround the guide beam and the distance between the legs is less than the width of the guide beam. Once installed on the guide beam, the clips or flanges surround the lower portion of the guide beam and prevent upward movement of the floor slat. The guide beams are screwed or welded to the trailer cross members.

Finally, once all of the slide bearings have been installed, a floor slat 12 will be placed over and snapped onto the bearing or bearings, thus locking the bearing in place and allowing the floor slat to ride on the bearings.

The reverse process is performed to remove each bearing. After the floor slats are removed, the bearings are removed by spreading the legs apart.

Figure 3:
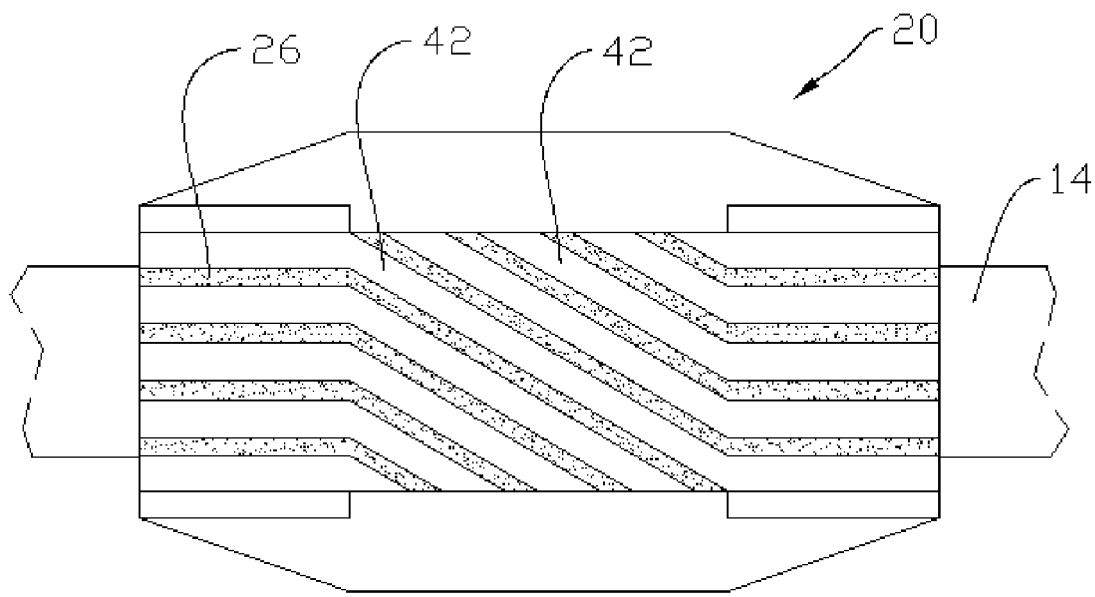
FIG. 3 illustrates a top view of the bearing shown in FIG. 1.

A further feature of the present invention is illustrated in FIG. 3 which is a top view of the bearing 20. The upper surface 26 of the bearing 20 includes a plurality of clean-out grooves 42. The clean-out grooves 42 are recessed into the upper surface 26 of the top of the bearing. Accordingly, any dirt or other materials that may be present between the upper surface 26 of the bearing and the floor slat 12 will be encouraged to fall into the grooves 42 and away from the interface between the bearing and floor slat. In one preferred arrangement shown in FIG. 3, the clean-out grooves 42 are arranged in an angled pattern. Other patterns are possible within the spirit and scope of the invention.

Figure 4:
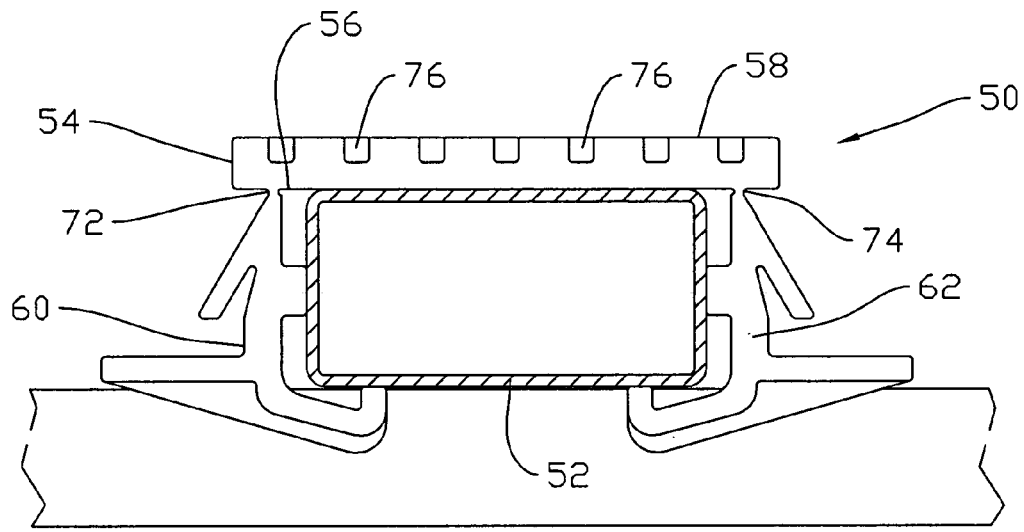
FIG. 4 illustrates an end view of an alternate embodiment of a bearing constructed in accordance with the present invention.
Figure 5:
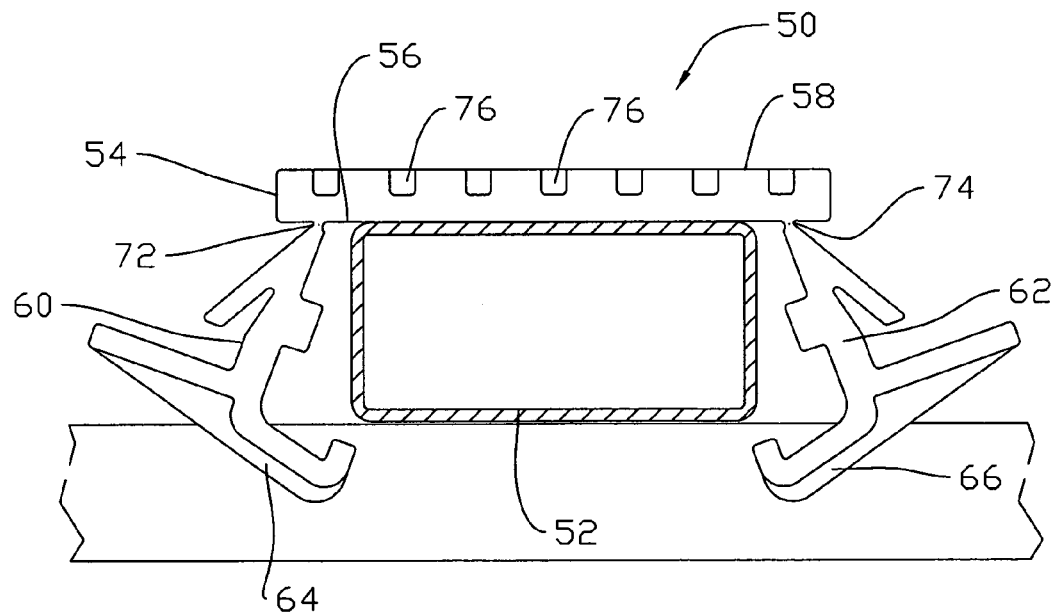
FIG. 5 illustrates the bearing shown in FIG. 4 being installed in a reciprocating floor conveyor system.

An alternate embodiment of the invention is shown in FIGS. 4 and 5. A bearing 50 includes an alternate hinge mechanism. In FIG. 4, a slide bearing 50 is shown installed on a guide beam 52.

The slide bearing 50 includes a load carrying top 54 which rests on and mates with the top of a guide beam 52. Accordingly, a lower surface 56 of the top 54 is generally flat and mates with the top of the guide beam 52. The load carrying top 54 also includes an upper surface 58, opposed to the lower surface, which is generally flat and receives the floor slat (not shown) thereon.

The bearing 50 includes first leg 60 and second leg 62, each of which extends outward and downward from the top 54. The first leg 60 has an inwardly extending clip or flange 64. The second leg 62 has an inwardly extending clip or flange 66.

A hinge mechanism 72 and 74 allows the first leg and second leg, respectively, to be separated from each other for the purpose of installation and, conversely, for removal.

Accordingly, the slide bearing 50 may be easily moved between a closed or use position as shown in FIG. 4 and an installation or removal position shown in FIG. 5 wherein the legs are separated. A pair of hinges 72 and 74 are provided at the intersection between the top and the legs.

The alternate embodiment shown in FIGS. 4 and 5 would include similar clean-out grooves 76.

Figure 6:
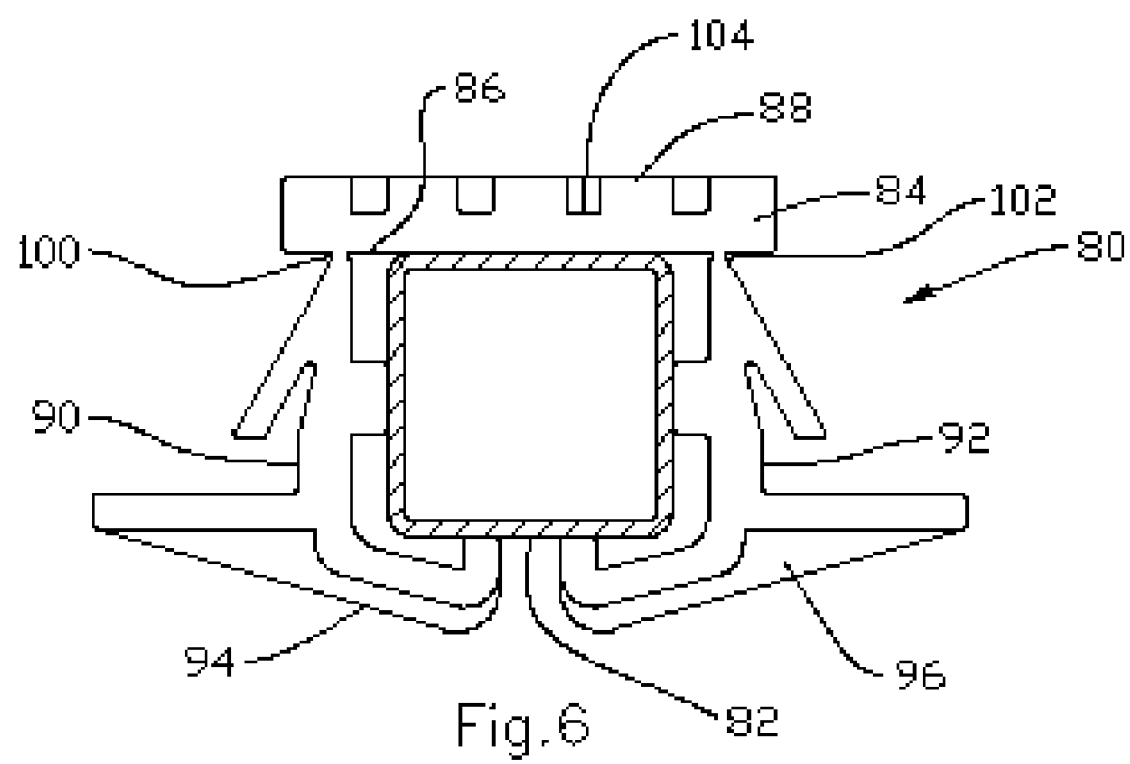
FIGS. 6 and 7 show an alternate view of a bearing for reciprocating floor conveyor.
Figure 7:
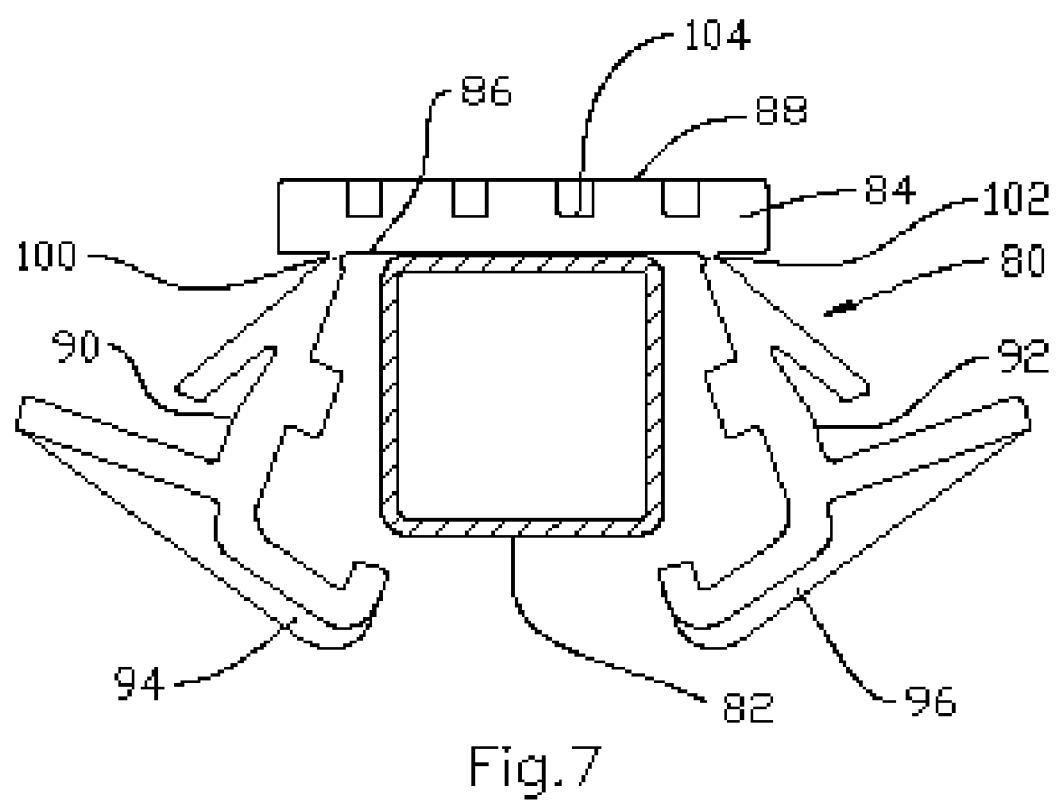

FIGS. 6 and 7 show a further alternate embodiment of a bearing 80 which includes a similar hinge mechanism to that shown in FIGS. 5 and 6.

The slide bearing is shown installed on a guide beam 82 in FIG. 6.

The slide bearing 80 includes a load carrying top 84 which rests on and mates with the top of the guide beam 82. Accordingly, a lower surface 86 of the top 84 is generally flat and mates with the top of the guide beam 82. The load carrying top 84 also includes an upper surface 88, opposed to the lower surface, which is generally flat and receives the floor slat (not shown in FIGS. 6 and 7) thereon.

The bearing 80 includes a first leg 90 and a second leg 92 each of which extends outward and downward from the top 54. The first leg 90 has an inwardly extending clip or flange 94. The second leg 92 has an inwardly extending clip or flange 96.

A hinge mechanism 100 and 102 allows the first leg and the second leg, respectively, to be separated from each other for the purpose of installation and, conversely, for removal.

Accordingly, the slide bearing 80 may be easily moved between a closed or use position as shown in FIG. 6 and an installation or removal position shown in FIG. 7 wherein the legs are separated.

The alternate embodiment shown in FIGS. 6 and 7 would also include similar clean-out grooves 104, as previously described.

Figure 8:
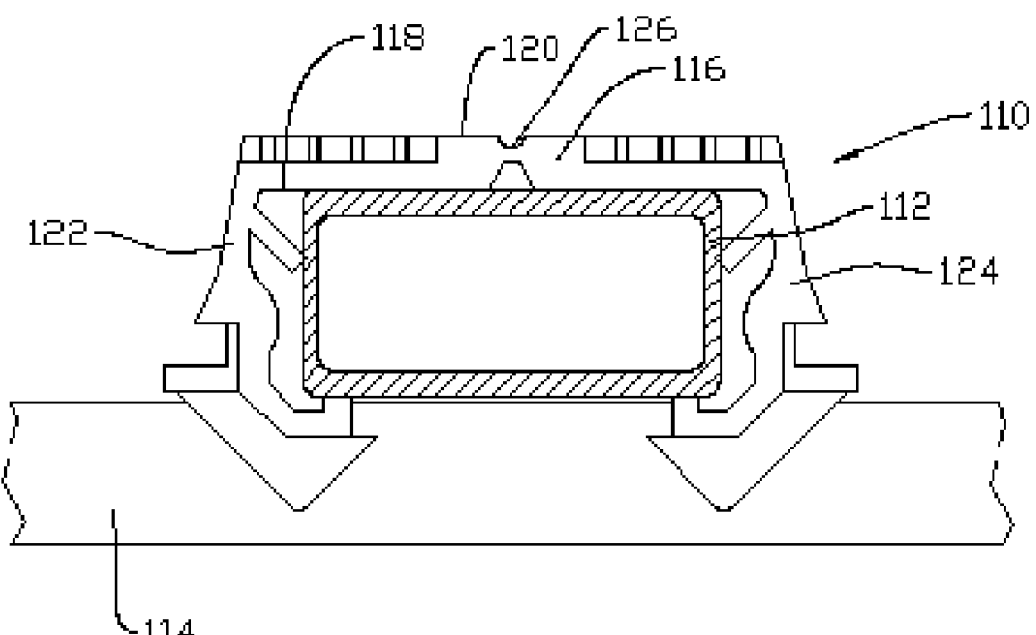
FIGS. 8 and 9 show a further alternate view of a reciprocating floor conveyor.
Figure 9:
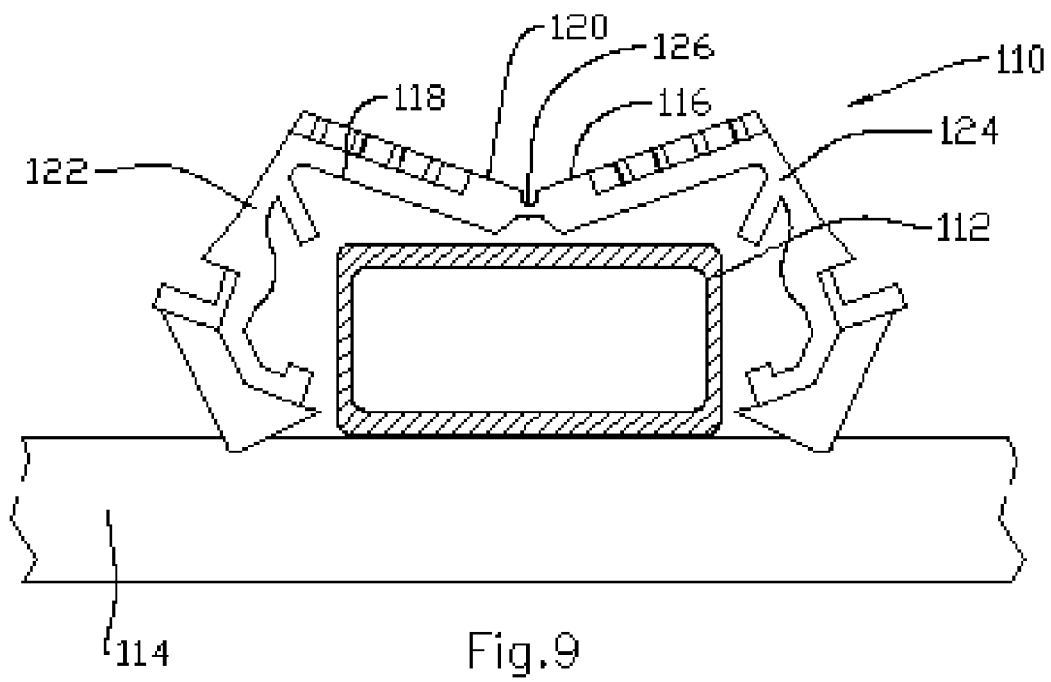

Finally, FIGS. 8 and 9 illustrate a further alternate embodiment of the invention. A bearing 110 includes a hinge mechanism. In FIG. 8, a slide bearing is shown installed on a guide beam 112 which is, in turn, secured to a transverse beam 114.

The slide bearing 110 includes a load carrying top 116 which rests on and mates with a top of the guide beam 112. Accordingly, a lower surface 118 of the top 116 is generally flat and mates with the top of the guide beam 112.

The load carrying top 116 also includes an upper surface 120, opposed to the lower surface, which is generally flat and receives the floor slat (not shown) thereon. When installed as shown in FIG. 8, the bearing 110 is mounted on and resides on the guide beam 112 and is stationary therewith.

The bearing 110 also includes a first leg 122 and a second leg 124, each of which extends outward and downward from the top. A hinge mechanism 126 which includes a recess or recesses formed into the lower surface 118 or the upper surface 120 of the slide bearing 110 permits the slide bearing to move between a closed or use position and an installation or removal position shown in FIG. 9.

Whereas, the present invention has been described in relation to the drawings attached hereto, it should be understood that other and further modifications, apart from those shown or suggested herein, may be made within the spirit and scope of this invention.

What is claimed is:

1. A bearing for a reciprocating floor conveyor wherein said reciprocating floor conveyor includes a plurality of sub-deck guide beams and a plurality of floor slats, which bearing comprises:
   a load carrying top having an upper surface to receive at least one said floor slat thereon and an opposed lower surface mating with one of said guide beams;
   a first leg extending from said top and a second leg extending from said top, said legs spaced from each other; and
   a hinge mechanism in said top to allow said legs to separate from each other for installation on said guide beam, wherein said hinge mechanism includes a recess in said lower surface of said top.

2. A bearing for a reciprocating floor conveyor as set forth in claim 1 wherein said upper surface of said top includes a plurality of clean-out grooves.

3. A bearing for a reciprocating floor conveyor as set forth in claim 1 including a brace wing extending laterally from said first leg and a brace wing extending laterally from said second leg.

4. A bearing for a reciprocating floor conveyor as set forth in claim 1 wherein said first leg is spaced from said second leg a distance slightly longer than said guide beams.

5. A bearing for a reciprocating floor conveyor as set forth in claim 1 including a clip or flange extending from said first leg and a clip or flange extending from said second leg wherein said clips or flanges extend toward each other.

6. A bearing for a reciprocating floor conveyor as set forth in claim 1 wherein said plurality of floor slats are parallel to each other and extend across transverse support beams.

7. A bearing for a reciprocating floor conveyor wherein said reciprocating floor conveyor includes a plurality of sub-deck guide beams and a plurality of floor slats, which bearing comprises:
   a load carrying top having an upper surface to receive at least one floor slat thereon and an opposed lower surface mating with one of said guide beams;
   a first leg and a second leg, each extending from said top and spaced from each other; and
   hinge means to move said legs between a use position wherein a distance between said legs is slightly longer than one said guide beam and an installation position wherein said legs may be separated while installing on said guide beam, wherein said hinge means includes a hinge at the intersection of said top and said first leg and a hinge at the intersection of said top and said second leg.

8. A bearing for a reciprocating floor conveyor as set forth in claim 7 wherein said upper surface of said top includes a plurality of clean-out grooves.

9. A bearing for a reciprocating floor conveyor as set forth in claim 7 including a clip or flange extending from said first leg and a clip or flange extending from said second leg wherein said clips or flanges extend toward each other.

10. A method to install a bearing for a reciprocating floor conveyor having a plurality of sub-deck guide beams and a plurality of floor slats, which method comprises:
    separating a first leg extending from a load carrying top from a second leg extending from said top using a hinge mechanism having a recess in said lower surface of said top;
    placing said legs over one of said guide beams so that said top rests on a surface of said guide beam;
    returning said legs to a position prior to said separating step; and
    installing one of said floor slats on an upper surface of said top.

11. A method to install a bearing as set forth in claim 10 including providing a plurality of clean-out grooves in said upper surface of said top.

12. A bearing for a reciprocating floor conveyor, wherein said reciprocating floor conveyor includes a plurality of sub-deck guide beams and a plurality of floor slats, which bearing comprises:
    a load carrying top having an upper surface to receive at least one of said floor slats and an opposed lower surface resting on at least one of said guide beams; and
    a plurality of clean-out grooves recessed into said upper surface of said load bearing top.

13. A bearing for a reciprocating floor conveyor as set forth in claim 12 wherein the clean-out grooves are arranged in an angled pattern.

14. A bearing for a reciprocating floor conveyor as set forth in claim 12 including a first leg and a second leg, each extending from said top and spaced from each other, and a clip or flange extending from said first leg, and a clip or flange extending from said second leg wherein said clips or flanges extend toward each other.

15. A method to install a bearing for a reciprocating floor conveyor having a plurality of sub-deck guide beams and a plurality of floor slats, which method comprises:
    separating a first leg extending from a load carrying top from a second leg extending from said top using a hinge mechanism including a hinge at the intersection of said top and said first leg and a hinge at the intersection of said top and said second leg;
    placing said legs over one of said guide beams so that said top rests on a surface of said guide beam;
    returning said legs to a position prior to said separating step; and
    installing one of said floor slats on an upper surface of said top.

16. A method to install a bearing as set forth in claim 15 including providing a plurality of clean-out grooves in said upper surface of said top.

\* \* \* \* \*